Figure 3:
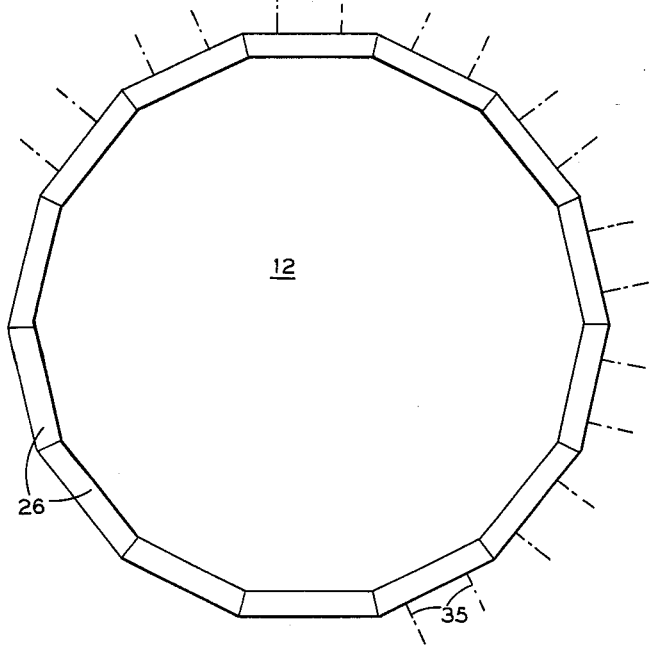

Feb. 2, 1965    E. DURHAM ETAL    3,168,073
FORCED FLOW WATER COOLED HOOD
Filed Dec. 1, 1961    2 Sheets-Sheet 1
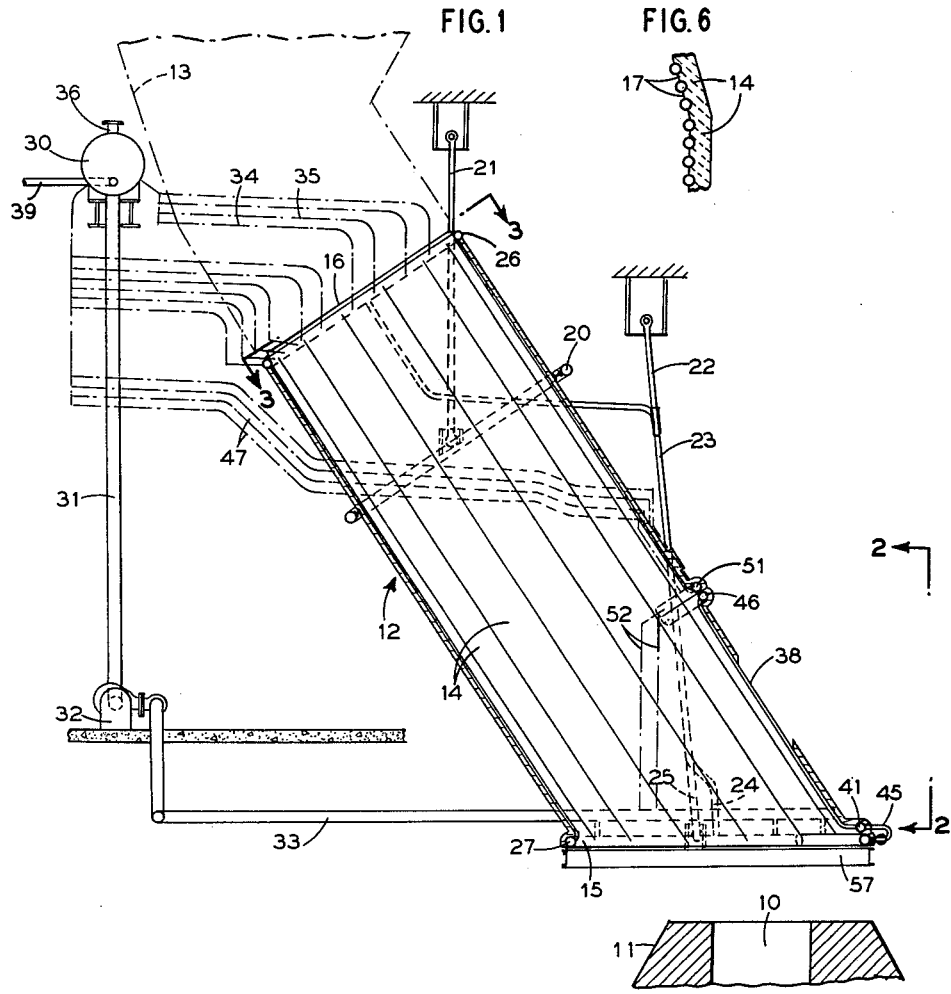
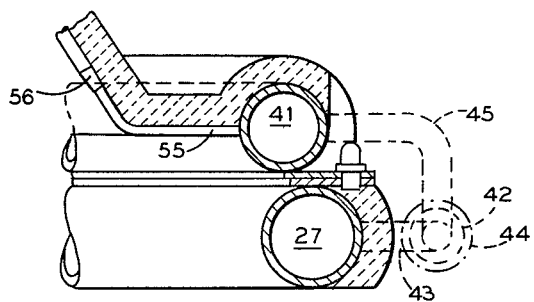
INVENTORS
Edwin Durham
Hubert G. Stallkamp
BY
*J. P. Moran*
ATTORNEY Feb. 2, 1965   E. DURHAM ETAL   3,168,073
FORCED FLOW WATER COOLED HOOD
Filed Dec. 1, 1961   2 Sheets-Sheet 2

INVENTORS
Edwin Durham
Hubert G. Stallkamp
BY
ATTORNEY 3,168,073
FORCED FLOW WATER COOLED HOOD
Edwin Durham, Wadsworth, and Hubert George Stallkamp, Akron, Ohio, assignors to The Babcock & Wilcox Company, New York, N.Y., a corporation of New Jersey
Filed Dec. 1, 1961, Ser. No. 156,246
10 Claims. (Cl. 122—7)

The present invention relates to heat exchange apparatus and more particularly to a fluid cooled duct or hood for confining a periodic flow of high temperature gases from a basic oxygen furnace.

In the basic oxygen furnace for the production of steel the charge of molten iron from a blast furnace or the like is mixed with steel scrap and the mixture thereafter refined by a jet of oxygen injected into the furnace. The refining cycle using oxygen requires about 50 to 60 minutes from furnace charge to furnace charge with 18 to 20 minutes of the cycle required for the oxygen blowing.

During the blowing portion of the cycle a tremendous quantity of gases are released at a temperature of the order of 3000 to 3500° F. The gases usually contain some unburned combustibles, such as carbon monoxide, and suspended solids, such as iron oxides. The combustibles are burned by the infiltration or positive introduction of air during passage of the gases through the hood of the present invention. In leaving the furnace the gases are cooled by indirect heat exchange to a vaporizable fluid and/or by the direct injection of steam or water into the gases so that when the gases are passed through dust separating devices, the gases are at a suitable lower temperature. The collected dust is normally returned to the oxygen steel refining furnace for further processing.

The cyclic flow of the high temperature gases from the furnace imposes severe operating conditions upon the passageway through which the gases from the furnace are passed. Thus the hoods heretofore in use have been characterized by a short service life due to the drastic temperature changes during operation and also due to erosion from the suspended solids in the gases.

The hood of the invention receives the periodic flow of hot gases discharged from the furnace during the oxygen treatment of the steel and is advantageously formed with fluid cooled walls to extend the service life of the structure. The walls of the hood are formed of a plurality of fluid cooled panels joined to form a rigid structure. Each panel consists of a row of tubes with the intertube spaces closed by a web or bar which is welded to the adjacent tubes. The panel tubes of the hood are connected for forced flow of fluid and the assembly is suspended as a unit to guide expansion and contraction as caused by thermal changes. The hood is provided with suitable openings for the gravitational admission of flux to the furnace, and to accommodate a downwardly extending lance which projects through the hood and into the furnace for the introduction of the oxygen in jetform against the metal within the furnace. Advantageously an access opening with a door is provided in the wall of the hood. The door is connected in the forced fluid flow circuit of the hood and may be removed without first draining the fluid from the remaining portion of the hood. The access opening in the hood, and the door, is necessary for access to the furnace for relining and servicing when necessary.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Figure 2:
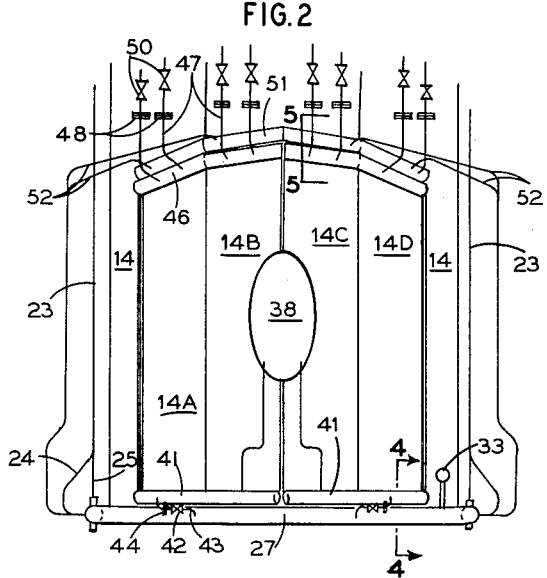
Figure 5:
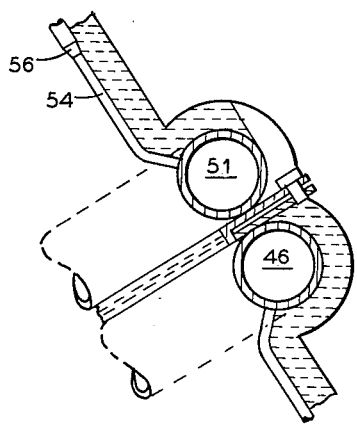

Of the drawings:
FIG. 1 is an elevation, partly in section, of the hood constructed and arranged in accordance with the present invention;
FIG. 2 is a view of a portion of the hood shown in FIG. 1 as viewed from the line 2—2;
FIG. 3 is a plan view of the hood in FIG. 1, as viewed from the line 3—3;
FIGS. 4 and 5 are enlarged sections of the apparatus taken on lines 4—4 and 5—5, respectively, of FIG. 2;
FIG. 6 is a section of a portion of the hood.

In the illustrated embodiment of the invention the open upper end 10 of a basic oxygen furnace 11 is arranged to discharge the hot gases into and through a duct or hood 12, with the gases thereafter passed through a discharge duct 13 to additional gas cooling and dust separating apparatus, not shown.

The hood is advantageously formed of a plurality of panels 14, each consisting of parallel tubes, where the panels are joined in edge relationship to define a hood of polygonal cross-section. In the particular embodiment of the invention disclosed in the drawings, the hood 12 is constructed of fourteen panels 14 with each panel 4' in width. The polygonal cross-section of the hood is 17'6¾" in major cross-section dimension (see FIG. 3). As shown, the hood is inclined upwardly at an angle of approximately 57° and is approximately 57' long as measured along the short side of the hood (see FIG. 1). The lower opening 15 of the hood is disposed in a horizontal plane while the upper open end 16 of the hood is inclined at an angle normal to the longitudinal axis of the hood and opens to the refactory lined duct extension 13 which in turn discharges the gas to additional cooling and dust separating equipment (not shown).

Each of the panels 14 constituting the walls of the hood is constructed of 1¼" tubes spaced on 1¾" centers, with the intertube spaces sealed by a ½" bar or web 17 which is welded to the adjacent tubes (see FIG. 6). The construction provides a gas impervious, rigid structure, with the adjacent panels welded along their longitudinal edges so as to form the polygonal cross-section of the hood 12, as shown in FIG. 13. Suitable re-enforcing members such as the illustrated circumferentially arranged member 20 re-enforces the structure and increases its rigidity.

As shown particularly in FIG. 1, the hood 12 is suspended by diametrically arranged pairs of hangers 21 and 22 with one pair of hangers 21 attached to opposite sides of the hood by means of a pivotable connection to the circumferential member 20, so that the upper end portion of the hood is supported by the hangers 21. The hangers 22 are each connected to downcomer tubes 23 positioned on opposite sides of the hood and open to hood inlet and outlet headers hereinafter described. The lower end portion of each of the downcomers 23 is offset, as at 24, with a hanger extension 25 attached to the lower end portion of the downcomer and pivotally attached to the lower header 27 of the hood. With this construction the thermal expansion and contraction of the tubes forming the panel walls of the hood is directed from the fixed positions of the upper hanger supports which serve as pivot points, with expansion and contraction moving the hood about the hanger pivot connections. Due to the cyclic nature of operation of the hood 12, in that hot gases are passed through the hood only about ⅓ of the operating time of the oxygen furnace 11, the fluid cooled walls of the hood are arranged for forced flow of fluid therethrough so as to insure adequate fluid flow distribution under all conditions of operation.

The fluid flow circuit of the hood 12 includes upper and lower ring headers 26 and 27, respectively, opening to the upper and lower end portions of the tubes of the panels 14. The headers 26 and 27 consist of multiple sections, each corresponding with a panel 14, and are physically connected as shown in FIG. 3, to form rigid upper and lower header rings which aid in providing rigidity in the assembly. A steam and water drum 30 (FIG. 1) is positioned upwardly adjacent the hood 12 structure and to one side of the duct extension 13. The drum is provided with a downcomer 31 which opens to the suction side of a pump 32 which discharges water through a pair of distributing manifolds 33 with one of each of the manifolds positioned on opposite sides of the hood 12. The manifold is provided with a pair of tubular offtake connections opening to each of the lower inlet header sections, serving each of the tube panels 14.

The mixture of steam and water discharging from the upper end of the tubes of each panel 14 passes to the corresponding upper section of the header 26 forming the upper end of the hood. Each header section 26 is provided with a pair of risers 34 and 35 which connect with the steam and water drum 30. The steam and water mixture discharged from the upper header 26 of the hood and delivered to the drum 30 is separated, with the steam discharged through a steam outlet 36, for any use desired in the steel mill. The separated water, plus any necessary makeup water introduced through feed pipe 39, is discharged from the drum 30 through the downcomer 31 to complete the fluid flow circuit of the hood.

A door for access to the furnace 11 is formed on the upper side of the hood 12 and, in the present instance, includes the lower end portion of four adjoining panels 14A, 14B, 14C and 14D (see FIG. 2). The panels are arranged so that two of each are located on opposite sides of the center line of the opening 38 which accommodates the oxygen lance used in supplying oxygen to the metal in furnace 11. The door panels are each supplied with separate upper and lower header sections 46 and 41, respectively, corresponding generally in shape with the lower and upper header sections 27 and 26, respectively, of the fixed position panels 14. The lower header 41 of each of the door panels is supplied with water from the manifold 33 by way of the lower header 27 downwardly adjacent the header 41. As shown in FIGS. 2 and 4, a valve 42 is positioned in supply pipe 43 adjacent the fixed lower header 27, and a flanged connection 44 is positioned adjacent the horizontally disposed offtake pipe 43 and a pipe extension 45 which opens to the lower header 41 of the door panel 14.

The upper headers 46 of the door panels 14A, 14B, 14C and 14D are shown in FIGS. 1, 2 and 5 where each is provided with a pair of riser tubes 47 from the two upper headers of the door panels located on one side of the oxygen lance opening 38 pass around the hood on one side thereof to open to the drum 30, while the corresponding riser tubes 47 from the pair of upper door headers 46 on the opposite side of the oxygen lance opening 38 pass around the opposite side of the hood to enter the drum. Each of the riser tubes 47 is provided with a flanged connection 48 and a valve 50 so that the flow circuit for the door panels can be disconnected for door removal without draining the tubes in the fixed position panels 14 of the hood.

With the door construction described the fixed portion of the panels 14 upwardly adjacent the movable door panels is provided with lower fixed position header 51 which supply water to the remaining portion of the tubes in the fixed panels in this particular portion of the hood. These headers are supplied with water directly from the distributing manifolds 33 by a pair of supply tubes 52 leading to each of the headers 46 from opposite sides of the hood. The steam and water mixture produced in these shortened panel portions discharges into the upper headers 26 and from there to the drum 30 through the risers 34 and 35 in the same manner as the remaining fixed panel sections.

In the particular embodiment of the invention illustrated in FIGURE 1, the fluid flow circuit of the hood is designed for use with a 300 ton oxygen steel furnace and will have a steam generating capacity of approximately 125,000 pounds of saturated steam per hour.

In the usual operating cycle of the oxygen steel furnace each 18 to 20 minutes cycle of oxygen injection will result in gas flow through the hood and will produce approximately 35,000 pounds of steam. A relatively high steam pressure of 450 p.s.i.g. is used to minimize the pump power required for proper distribution of water to the tubes in each of the panels. It will be appreciated that lower pressures would have a comparatively higher density of steam and water mixture, and to aid in distribution of water, the lowermost portion of each of the tubes in each panel opening from the inlet header 27 is provided with an 18" length of ⅜" diameter tube, as for example 54 in FIG. 5 and 55 in FIG. 4. At the upper end of the ⅜" diameter tube a fitting 56 provides the transition into the 1¼" diameter tube forming the main tubular portion of each panel. The length and cross-section area of the ⅜" diameter inlet portion has been selected to provide an entrance pressure drop which is substantially equal to the shock and friction pressure loss in the rest of the tube, thereby insuring substantially uniform distribution of water to each of the tubes of the panels. The total pressure drop of circulation through the system at rated output is of the order of a 35 p.s.i., at a pressure of 450 p.s.i.g., and would be higher at a lower pressure.

In the operation of the hood, water is continuously passed through the tubes of the panels even when there is practically no gas flow through the hood. The pump is sized to insure a minimum flow velocity of approximately 3 feet per second through the tubes, under low gas flow conditions. When maximum flow of hot gases are passed through the hood the water flow velocity will increase to approximately 15 feet per second. Thus, in the construction described adequate water flow through the tubes of the wall panels 14 is maintained by the pump 32 so as to protect the panel walls. The water used for heat exchange purposes in the hood is treated to maintain high purity so as to avoid corrosion or deposits in the flow circuit.

As shown particularly in FIGURE 1, the lower end of the hood 12 below the header 27 is provided with a protective baffle 57 or bumper which is hung therefrom and is considered expendable. The baffle is cooled by untreated plant service water and the protection provided is desirable to avoid damage to the header 27 of the hood 12 during manipulation of the oxygen furnace 11, and to avoid any accidental damage to the hood which might occur during the handling of heavy equipment in the vicinity of the furnace.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

The claims are:

1. Heat exchange apparatus comprising panels of coplanar tubes joined to form imperforate walls of a gas-pass, means for passing a hot gas through said gas-pass, means for passing a wall cooling fluid through said tubes to absorb heat from the hot gases passing through said gas-pass, means for pendantly supporting said gas-pass walls as a unit at spaced positions therealong including hanger means extending downwardly from a fixed position, said hanger means having a pivotable attachment on one end portion of said gas-pass, and separate hanger means extending downwardly from a fixed position, said separate hanger means having a pivotable attachment on an opposite end portion and being spaced longitudinally of said gas-pass from said one end portion, said supporting means permitting guided thermal movement of said heat exchange apparatus relative to said fixed positions.

2. Heat exchange apparatus comprising panels of co-planar tubes joined to form imperforate walls of a gas-pass, means for passing a hot gas through said gas-pass, means for passing a wall cooling fluid through said tubes to absorb heat from the hot gases passing through said gas-pass, means for supporting said gas-pass walls including a pair of hangers extending downwardly from a fixed position, said hanger means having a pivotal attachment on opposite walls of the upper portion of said gas-pass, and a second pair of hangers extending downwardly from a fixed position, said separate hanger means having a pivotal attachment on opposite walls of the lower portion of said gas-pass, and means forming a removable portion of some of said panels adjacent an end portion of said gas-pass walls.

3. Heat exchange apparatus comprising panels of co-planar tubes joined to form imperforate walls of an inclined gas-pass, means for passing a hot gas through said gas-pass, means for passing a wall cooling fluid through said tubes to absorb heat from the hot gases passing through said gas-pass, means for supporting said gas-pass walls from above including a pair of hangers extending downwardly from a fixed position, said pair of hangers having a pivotal attachment on opposite walls of the upper portion of said gas-pass, and a second pair of hangers transversely spaced from said first pair of hangers and extending downwardly from a fixed position, said second pair of hangers having a pivotal attachment on opposite walls of the lower portion of said gas-pass, and means forming a removable portion of some of said panels adjacent an end portion of said gas-pass walls.

4. Heat exchange apparatus comprising panels of co-planar tubes joined to form imperforate walls of a gas-pass, means for passing a hot gas through said gas-pass, means for passing a wall cooling fluid through said tubes to absorb heat from the hot gases passing through said gas-pass including headers at opposite ends of said co-planar tubes, a pair of hangers extending downwardly from a fixed position, said hangers having a pivotal attachment on opposite sides of the upper portion of said gas-pass, and a second pair of hangers extending downwardly from a fixed position, said second pair of hangers having a pivotal attachment on opposite sides of the lower header of said gas-pass, and means forming a removable portion of some of said panels adjacent an end portion of said gas-pass walls, each of said removable panel portions having an upper and lower header detachably connected to the cooling fluid flow circuit of the tubes forming said imperforate walls.

5. Heat exchange apparatus comprising panels of co-planar tubes joined to form the imperforate walls of a gas-pass hood, a steam and water drum positioned above said gas-pass, a fluid pump, means connecting the water space of said drum with said pump and said pump with the lower ends of the co-planar tubes, means connecting the upper ends of said co-planar tubes with the steam and water drum, means for passing a hot gas through said hood, means for supporting said hood from above including a pair of hangers extending downwardly from a fixed position, said pair of hangers having a pivotal attachment on opposite sides of the upper portion of said hood, and a second pair of hangers extending downwardly from a fixed position, said second pair of hangers having a pivotal attachment on opposite sides of the lower portion of said hood, and means forming a removable portion of some of said panels adjacent an end portion of said hood.

6. Heat exchange apparatus comprising panels of co-planar tubes joined to form the imperforate walls of a hood of polygonal cross-section, a steam and water drum positioned above said hood, a pump, means connecting the water spaces of said drum with said pump and said pump with the lower ends of the co-planar tubes, means connecting the upper ends of said co-planar tubes with the steam and water drum, means for passing a hot gas through said hood, means for supporting said hood from above for guided thermal expansion including hanger means interconnecting spaced longitudinal locations on said hood with fixed support locations above said hood, at least one of said hanger means including a length of fluid cooled tube connected in the flow circuit of said drum, said pump and said tubes, and means forming a removable portion of some of said panels adjacent an end portion of said hood, said last named panels being connectable in the flow circuit from said pump to said drum.

7. Heat exchange apparatus comprising panels of co-planar tubes joined to form the imperforate walls of an inclined hood of substantially uniform cross-sectional flow area, a steam and water drum postioned above said hood, a pump, means connecting the water space of said drum with said pump and said pump with the lower ends of the co-planar tubes, means connecting the upper ends of said co-planar tubes with the steam and water drum, means for passing a hot gas through said hood, means for supporting said hood from above including a pair of hangers extending downwardly from a fixed position to a pivotal attachment on opposite sides of the upper portion of said hood and a second pair of hangers extending downwardly from a fixed position to a pivotal attachment on opposite sides of the lower portion of said hood, and means forming a removable portion of some of said panels adjacent an end portion of said hood.

8. Heat exchange apparatus comprising panels of co-planar tubes joined to form the imperforate walls of an inclined hood of polygonal cross-section, a steam and water drum positioned above and to one side of said hood, a pair of manifolds positioned adjacent the lower end of the hood, a pump, means connecting the water space of said drum with said pump and said pump with said pair of manifolds, a plurality of lower headers opening to the lower ends of the tubes of each panel, means connecting all of said lower headers in a polygonal ring, means connecting said manifolds with said lower headers for forced flow of water thereto, means connecting the upper ends of said co-planar tubes with the steam and water drum, means for passing a hot gas through said hood, means for supporting said hood from above, and means forming a removable portion of some of said panels adjacent an end portion of said hood, each of the removable portions of said panels having an upper and lower header detachably and directly connected to said drum and manifolds respectively for flow of fluid therethrough.

9. Heat exchange apparatus according to claim 1 wherein said panels of co-planar tubes are formed of adjacent spaced tubes joined by metallic webs welded to adjacent tubes.

10. Heat exchange apparatus according to claim 9 wherein said panels are joined to form inperforate walls of an inclined gas-pass of polygonal cross-sectional gas flow area.

References Cited by the Examiner
UNITED STATES PATENTS

| 719,501 | 2/03 | Penney | 122—340 |
| 1,972,052 | 8/34 | La Mont | 122—39 |
| 2,636,351 | 4/53 | Brooks | 122—235 |
| 2,952,975 | 9/60 | Braddy | 122—478 |
| 2,987,052 | 6/61 | Armacost | 122—6 |

FOREIGN PATENTS

| 877,046 | 9/61 | Great Britian. |

OTHER REFERENCES

German Printed Application No. 1,063,191, 8/59.

PERCY L. PATRICK, *Primary Examiner.*

FREDERICK L. MATTESON, JR., *Examiner.*